Aug. 15, 1933.  J. E. THIERMANN  1,922,751
MACHINE TOOL
Filed May 16, 1931  3 Sheets-Sheet 1

Inventor:
J. Emil Thiermann

Aug. 15, 1933.　　　J. E. THIERMANN　　　1,922,751
MACHINE TOOL
Filed May 16, 1931　　　3 Sheets-Sheet 2
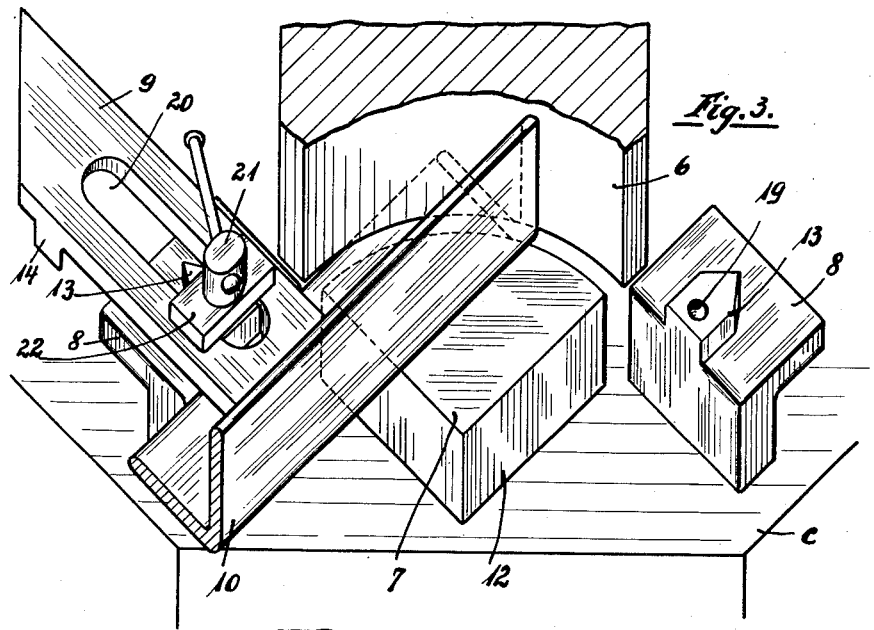
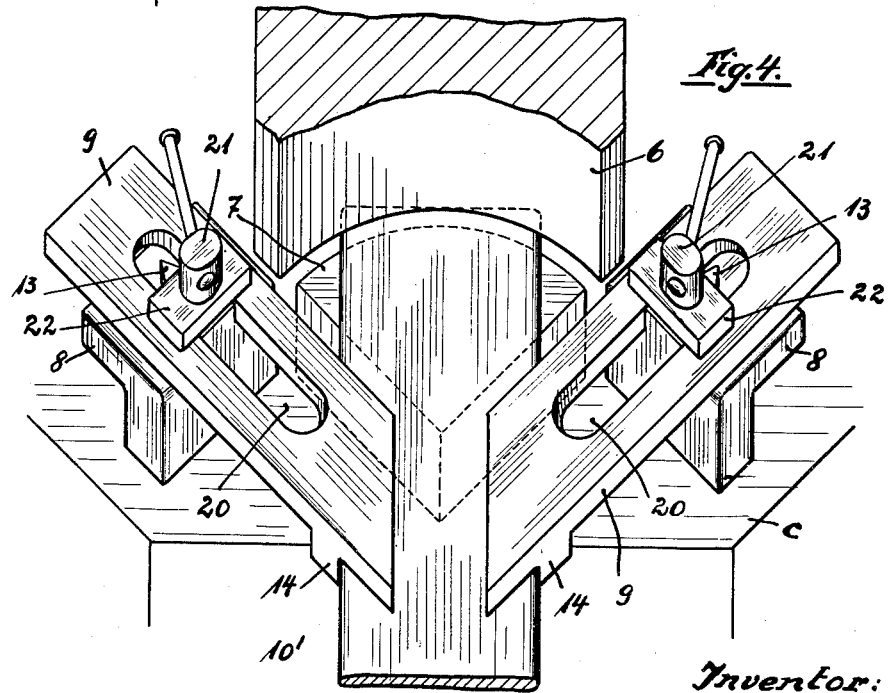
Inventor:
J. Emil Thiermann
by Kserlikain
Atty.

Fig. 5.
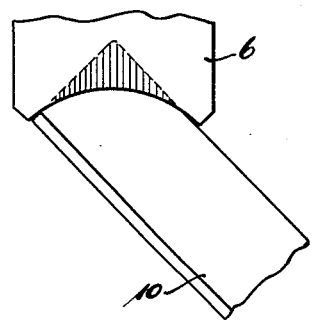
Fig. 6.
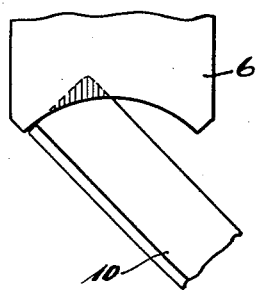
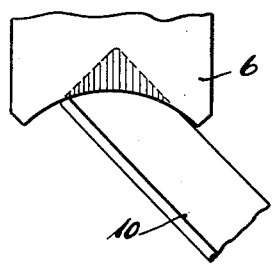
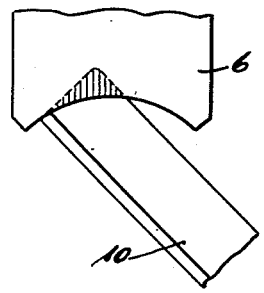
Fig. 7.
Fig. 8.

Patented Aug. 15, 1933

1,922,751

UNITED STATES PATENT OFFICE 1,922,751

MACHINE TOOL

Johann Emil Thiermann, Stuttgart, Germany

Application May 16, 1931, Serial No. 537,961, and in Germany May 22, 1930

13 Claims. (Cl. 29—34)

My invention relates to machine tools, and more particularly to a machine tool in which tools for performing several operations are combined in a single machine.

It is an object of my invention to provide a machine of this type which combines simplicity and small size with suitability and adaptability.

To this end I provide a support, a slide mounted to reciprocate on the support, cooperating tools and fixtures on the support and on the slide, and means arranged in a central position with respect to the tools and fixtures for imparting relative movement to the support and the slide.

The machine is particularly designed for the notching and the circular trimming of flat and sectioned bars. As compared with the machines hitherto used for this purpose, the new machine is very small and can be operated with great ease. It may be designed for high output and for plants of any size, but on account of its adaptability it is particularly suitable for medium and small plants.

The machine permits the notching or circular trimming of bars for sections of various kinds and various sizes in various selective ways with a single set of tools.

In the drawings affixed to this specification and forming part thereof a machine embodying my invention is illustrated diagrammatically by way of example.

In the drawings

Fig. 3 is a perspective illustration of a shearing fixture on the machine as applied to the trimming of angle sections, Fig. 4 is a perspective illustration showing the same fixture in the position for trimming flat bars, Figs. 5-8 illustrate several relative positions of a shearing blade and an angle section.

Figure 1:
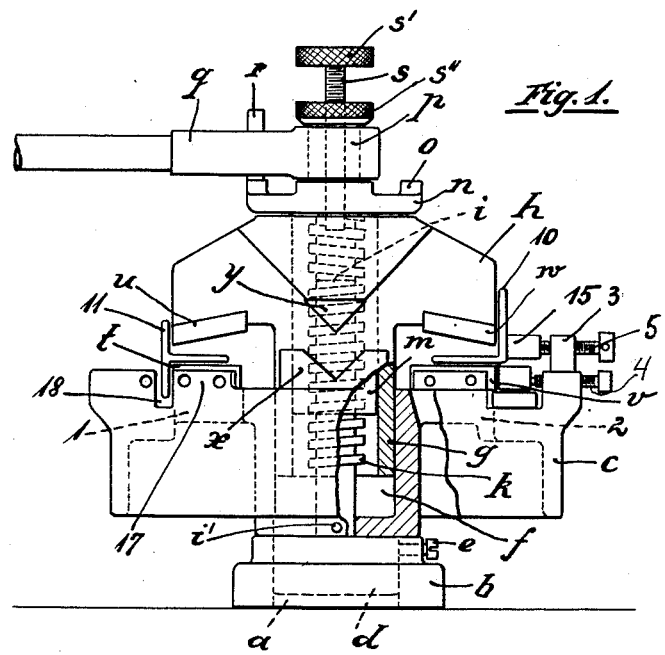
Fig. 1 is an elevation of the machine, partly in axial section.
Figure 2:
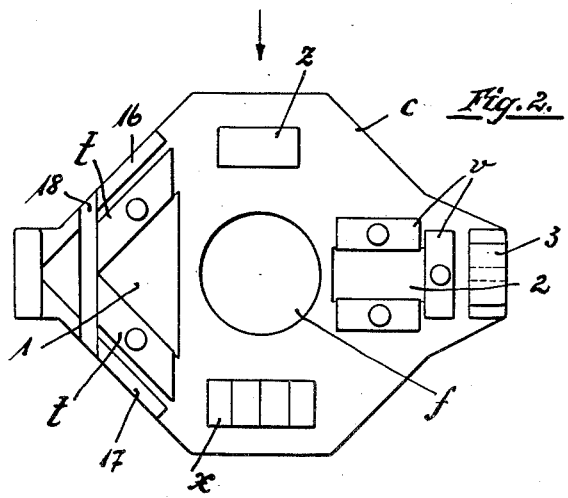
Fig. 2 is a plan view of its support, the slide being omitted.

Referring now to the drawings and first to Figs. 1 and 2, $b$ is a base plate, $a$ is a central hole in the base plate, $d$ is a pivot in the hole $a$, $c$ is a support at the underside of which the pivot is arranged, and $e$ is a set screw in the base $b$ for holding the pivot and the support against rotation. $f$ is a central bore in the support $c$, and $g$ is a spigot on the tool slide $h$ which is mounted to slide in the bore $f$ but is held against rotation by a spline or other suitable means. $k$ is a threaded spindle which is arranged axially in the bore $f$ and held against rotation by any suitable means, for instance, a pin $i'$, in the bottom plate of the support $c$. $m$ is a threaded sleeve on the spindle $k$ which is mounted to rotate in the slide $h$ but is held against axial displacement with respect to the slide. $n$ is a disc having projections or teeth $o$ which is mounted at the upper end of the sleeve $m$ and bears on the top of the slide $h$, $p$ is a pin projecting upwardly from the plate $n$, $q$ is a lever which is mounted to turn on the pin $p$, and $r$ is a pawl on the lever which is adapted to cooperate with the teeth $o$ on the plate $n$. When the lever $q$ is rocked about the pin $p$ in a manner per se known the sleeve $m$ is rotated and the slide $h$ is displaced with respect to the support $c$. $s$ is a screw in the pin $p$ the lower end of which is adapted to abut against the upper end $i$ of the spindle $k$ so as to limit the downward movement of the slide $h$. The screw is adjusted by rotating its knurled handle $s'$, and locked by a nut $s''$, also knurled. By these means the limit of the downward displacement of the slide $h$ may be varied as required.

The machine illustrated by way of example is equipped with four fixtures, to wit, two notching fixtures, a bending fixture, and a shearing fixture for trimming. The notching fixture at the left of the machine is designed for shearing v-notches in bars or sections. $t$, $t$ are two bottom shearing blades on the support $c$ which may be inclined at 45 degs. to the longitudinal edges of the bar to be notched, a T 11 being shown by way of example in Fig. 1, with its web supported on the two bottom blades $t$ and its lower flange in a recess 18 of the support $c$, $u$ are the top blades in the slide $h$, which cooperate with the bottom blades $t$, and $l$ is a discharge opening for the cuttings intermediate the bottom blades $t$. The fixture at the right serves for shearing rectangular notches, for instance, in one flange of an angle section 10, Fig. 1. Three bottom blades $v$ are arranged in the shape of the letter U at three sides of a cuttings-discharge opening 2 in the support $c$, and corresponding top blades $w$ are arranged in the slide $h$. Means for adjusting the blades may be provided. Such means are illustrated for the transverse bottom blade $v$ only but it is understood that similar means may be applied to all top and bottom blades. 4 is a threaded spindle which is inserted in a bracket on the support $c$ and with its inner end engages the transverse bottom blade $v$. Means may also be provided for locating the blank 10 with respect to the blades $v$, $w$ and such means may comprise a bracket 3, a spindle 5, and a block 15 which is inserted between the inner end of the spindle 5 and the vertical flange of the angle section 10. Similar means may be applied to the strips 16 and 17 at the V-notching blades t, t.

The bending fixture comprises a V-shaped bending die x on the support c and a V-shaped bending block y on the slide h, and the trimming fixture comprises the members which will be described in detail with reference to Figs. 3 and 4. Its location is determined by the cuttings-discharge opening z in Fig. 2. If desired it may be replaced by a punching fixture of any suitable type.

The discharge openings 1, 2 and z in the support c are so positioned with respect to the base plate b that the cuttings from the several blanks drop freely and that the nuts for securing exchangeable bottom blades in the support c are accessible from below.

The facility of turning the support c and the slide h about the axis of the pivot d in the base plate b permits the handling of long articles, such as girders, bars and the like, in the most favorable position, and it is not necessary that an article on which several operations are performed by the machine be moved into another position or tilted at considerable difficulty. The article is maintained substantially in the most convenient position and the tools which are to operate on the article are located by turning the support c and the slide h and fixing them in the given position by setting the screw e.

The simplicity and small size of the machine and the facility of so designing the support c that it projects beyond the base b, are principally due to the fact that the means for reciprocating the slide, viz. the spindle k and the sleeve m are arranged in a central position intermediate the several tools and fixtures on the machine and directly engage the support c and the slide h. This design dispenses with the usual large and heavy frames and tables for transmitting forces.

Other means than the spindle k and its sleeve m, such as for instance a cam (not shown), may obviously be provided for reciprocating the slide h. The configuration of the several members, of the means for guiding and adjusting them, and of the base blade b and its securing means, may be modified in various ways and adapted to given conditions.

Referring now to Figs. 3 and 4, the trimming fixture located at z, Fig. 2, comprises a curved concave top blade 6 on the slide h and a correspondingly curved convex bottom blade 7 on the support c. In the example illustrated the bottom blade 7 is a circular sector of 90 degs. and the top blade 6 is also curved as an arc of a circle. Two guiding blocks 8 are arranged at opposite ends of the top blade 6 with their guiding faces as tangents to the circular curvature of the concave top blade 6. Preferably the guiding blocks are made higher than the bottom blade 7, and are designed as supports for blank holders. 13 is a rib projecting from the upper face of each guiding block, 19 is a threaded hole in the rib, 9 is a blank holder which is slotted at 20 for the reception of the rib 13, 21 is a binder inserted in the threaded hole 19, and 22 is a clamping plate intermediate the binder and the blank holder. Each blank holder has a rib 14 on its lower face for a purpose which will be described.

Fig. 3 shows the trimming fixture the position for shearing the horizontal flange of the angle section 10. The section is placed on the upper face of the bottom blade 7 with its horizontal flange and the outer edge of the flange is abutted against the inner face of the guiding block 8 at the left on which a blank holder 9 has been secured. In the example illustrated in Fig. 3, the trimmed outer edge of the flange is a tangent to the arc of the top blade 6. If the length of the flange is such that it extends throughout the width of the arc as shown in Fig. 5, the curve to which the flange is trimmed, corresponds to a quadrant, with the tangent to the arc at the apex edge. Obviously the section may be applied to the guiding block 8 at the right in Fig. 3 in a similar manner.

While Fig. 5 shows diagrammatically the trimming on a full quadrant, Fig. 6 shows a trimming operation in which the tangent to the arc at the left is substantially at right angles to the apex line of the section 10. Fig. 7 shows the outer edge of the flange in tangential relation to the arc similar to the disposition in Fig. 3 but with the section 10 obviously applied to the block 8 at the right. Fig. 8 is one of the many selective intermediate positions in which the bar 10 may be placed.

For flanged sections the top blade 6 and its holder (not shown) serve as an abutment for the vertical flanges and preferably the sides of the top blade 6 project beyond the sides of the bottom blade 7 for about the thickness of a flange, so that when sections having a double-sided flange, for instance, T's, are trimmed the flange is abutted against one of the projecting sides of the top blade 6. The sections, instead of being placed with one flange on top of the bottom blade 6 in horizontal position, and the other flange in vertical position, as shown in Fig. 3, may be inverted so that the vertical flange engages one of the sides 12 of the bottom blade. Obviously the position of the blank holders 9 must be adapted to the inversion.

In Fig. 4 a flat bar 10' is shown as being trimmed by the blades 6 and 7. In this case two blank holders 9 are provided at opposite sides of the bar, secured to the blocks 8 and 9 by means of the ribs 13 and the slots 20, and held in position by the binders 21 and the clamping plates 22. The ribs 14 on the lower faces of the blank holders serve as guides for the bar.

Instead of the parallel ribs 13 for guiding the blank holders 9, means (not shown) for rocking the holders on the blocks 8, or for pivotally mounting the blocks on the support c, may be provided for holding the bars in any desired position.

I wish it to be understood that I do not desire to be limited to the exact details of construction shown and described for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. A machine tool comprising a base, a stationary member mounted to turn in said base, and a movable member mounted to reciprocate with respect to said stationary member, cooperating tools and fixtures on said members, a threaded spindle arranged in the axis of said pivot, a threaded sleeve on said spindle which is mounted to rotate in, but held against axial displacement with respect to said movable member, and means for rotating said sleeve.

2. A machine tool comprising a stationary member and a movable member, cooperating tools and fixtures on said members, means operatively connected to said members and arranged in a central position with respect to said tools and fixtures for imparting relative movement to said members, and adjustable means for limiting the relative movement.

3. A machine tool comprising a stationary member and a movable member, a curved bottom shearing blade on one of said members, a curved top shearing blade on the other member which is adapted to cooperate with said first-mentioned shearing blade, bar-guiding means combined with said blades, and means for imparting relative movement to said members.

4. A machine tool comprising a stationary member and a movable member, a curved bottom shearing blade on one of said members, a curved top shearing blade on the other member which is adapted to cooperate with said first-mentioned shearing blade, bar-guiding means combined with said blades and arranged tangentially with respect to the curvature of said blades, and means for imparting relative movement to said members.

5. A machine tool comprising a stationary member and a movable member, a curved bottom shearing blade on one of said members, a curved top shearing blade on the other member which is adapted to cooperate with said first-mentioned shearing blade, bar-guiding means combined with said top blade, and means for imparting relative movement to said members.

6. A machine tool comprising a stationary member and a movable member, a curved bottom shearing blade on one of said members, a curved top shearing blade on the other member which is adapted to cooperate with said first-mentioned shearing blade, adjustable bar-guiding means combined with said blades, and means for imparting relative movement to said members.

7. A machine tool comprising a stationary member and a movable member, a curved bottom shearing blade on one of said members, a curved top shearing blade on the other member which is adapted to cooperate with said first-mentioned shearing blade, bar-guiding means combined with said blades, adjustable blank-holding means on said guiding means, and means for imparting relative movement to said members.

8. A machine tool comprising a stationary member and a movable member, a curved bottom shearing blade on one of said members, a curved top shearing blade on the other member which is adapted to cooperate with said first-mentioned shearing blade, bar-guiding means combined with said blades, adjustable blank-holding means on said guiding means, blank-guiding projections on said holding means, and means for imparting relative movement to said members.

9. A machine tool comprising a stationary member and a movable member, a curved bottom shearing blade on one of said members, a curved top shearing blade on the other member which projects beyond both sides of said bottom shearing blade and is adapted to cooperate with said first-mentioned shearing blade, bar-guiding means combined with said blades, and means for imparting relative movement to said members.

10. A machine tool comprising a stationary member and a movable member, a curved bottom shearing blade on one of said members, a curved top shearing blade on the other member which is adapted to cooperate with said first-mentioned shearing blade, and to serve as an abutment for the end of the blank, bar-guiding means combined with said blades, and means for imparting relative movement to said members.

11. A machine tool comprising a stationary member and a movable member, a curved bottom shearing blade on one of said members, a curved top shearing blade on the other member which is adapted to cooperate with said first-mentioned shearing blade, bar-guiding means combined with said blades, the upper face of said guiding means being arranged at a higher level than the upper face of said bottom shearing blade, and means for imparting relative movement to said members.

12. A machine tool comprising a stationary member and a movable member, a sector-shaped bottom shearing blade not larger than a quadrant on one of said members, a top shearing blade curved in conformity with the sector-shape of said bottom shearing blade on the other member which is adapted to cooperate with said first-mentioned shearing blade, bar-guiding means combined with said blades, and means for imparting relative movement to said members.

13. A machine tool for trimming sectioned bars comprising a stationary member and a movable member, a curved bottom shearing blade on one of said members which is raised beyond the member for a distance equal to the depth of a flange on the section, a curved top shearing blade on the other member which is adapted to cooperate with said first-mentioned shearing blade, bar-guiding means combined with said blades, and means for imparting relative movement to said members.

J. EMIL THIERMANN.